United States Patent
Runkel (10) Patent No.: US 12,186,825 B2
(45) Date of Patent: Jan. 7, 2025

(54) METHOD FOR PRODUCING A CONTINUOUS STRIP-SHAPED COMPOSITE MATERIAL

(71) Applicant: SMS group GmbH, Düsseldorf (DE)

(72) Inventor: Thomas Runkel, Siegen (DE)

(73) Assignee: SMS GROUP GMBH, Düsseldorf (DE)

( * ) Notice: Subject to any disclaimer, the term of this patent is extended or adjusted under 35 U.S.C. 154(b) by 1061 days.

(21) Appl. No.: 16/462,312

(22) PCT Filed: Nov. 16, 2017

(86) PCT No.: PCT/EP2017/079415
§ 371 (c)(1),
(2) Date: May 20, 2019

(87) PCT Pub. No.: WO2018/091572
PCT Pub. Date: May 24, 2018

(65) Prior Publication Data

US 2019/0366471 A1     Dec. 5, 2019

(30) Foreign Application Priority Data

Nov. 18, 2016  (DE) ...................... 10 2016 222 813.7
Dec. 7, 2016   (DE) ...................... 10 2016 224 412.4
Dec. 28, 2016  (DE) ...................... 10 2016 226 277.7

(51) Int. Cl.
*B23K 20/04*     (2006.01)
*B21B 1/02*      (2006.01)
(Continued)

(52) U.S. Cl.
CPC ............... *B23K 20/04* (2013.01); *B21B 1/02* (2013.01); *B21B 1/04* (2013.01); *B21B 1/22* (2013.01);
(Continued)

(58) Field of Classification Search
CPC ....................................................... B23K 20/04
See application file for complete search history.

(56) References Cited

U.S. PATENT DOCUMENTS 1,616,861 A * 2/1927 Laughlin ............... B21C 37/083
                                                       228/17
2,539,247 A * 1/1951 Hensel .................... B23K 20/24
                                                       228/198
(Continued)

FOREIGN PATENT DOCUMENTS

DE     28 55 804 A1    6/1979
DE     33 32 656 A1    3/1984
(Continued)

OTHER PUBLICATIONS wikipedia.com, "Continuous Casting", https://en.wikipedia.org/wiki/Continuous_casting#:~:text=Range%20of%20continuously%20cast%20sections,-Casting%20machines%20are&text=Conventional%20slabs%20lie%20in%20the,to%203250%C3%97150%20mm (Year: 2024).*

(Continued)

*Primary Examiner* — Erin B Saad
*Assistant Examiner* — Carlos J Gamino
(74) *Attorney, Agent, or Firm* — Maier & Maier, PLLC (57) ABSTRACT

A device and a method for producing a continuous strip-shaped composite material. For this purpose, a base material, which is produced using at least one casting machine as a continuous strand, in particular made of steel, and providing at least one cladding material, which is unwound in the form of at least one metal strip by a coil unwinding unit are provided. Subsequently, a slab which has formed by solidification from the strand produced by the casting machine and the metal strip unwound by the coil unwinding unit, in the hot state are brought together, wherein the materials, which are moved in the direction toward one another, (Continued)

formed from the slab and the unwound metal strip are hot rolled, so that a single continuous strip-shaped composite material is thus produced by roll cladding. The base material is continuously cast in the vertical direction in the casting direction.

17 Claims, 5 Drawing Sheets (51) Int. Cl.
| | |
|---|---|
| B21B 1/04 | (2006.01) |
| B21B 1/22 | (2006.01) |
| B21B 1/46 | (2006.01) |
| B21D 39/03 | (2006.01) |
| B22D 11/14 | (2006.01) |
| B22D 11/16 | (2006.01) |
| B23K 20/26 | (2006.01) |
| B32B 15/01 | (2006.01) |
| C21D 8/02 | (2006.01) |
| C21D 9/56 | (2006.01) |
| C21D 9/60 | (2006.01) |
| B21B 1/26 | (2006.01) |
| B21B 1/38 | (2006.01) |
| B21C 47/22 | (2006.01) |
| B23K 101/16 | (2006.01) |
| B23K 103/04 | (2006.01) |

(52) U.S. Cl.
CPC .............. *B21B 1/466* (2013.01); *B21D 39/03* (2013.01); *B22D 11/142* (2013.01); *B22D 11/16* (2013.01); *B23K 20/26* (2013.01); *B32B 15/011* (2013.01); *C21D 8/0205* (2013.01); *C21D 8/0215* (2013.01); *C21D 8/0226* (2013.01); *C21D 9/561* (2013.01); *C21D 9/562* (2013.01); *C21D 9/60* (2013.01); *B21B 2001/028* (2013.01); *B21B 2001/225* (2013.01); *B21B 1/26* (2013.01); *B21B 2001/383* (2013.01); *B21C 47/22* (2013.01); *B23K 2101/16* (2018.08); *B23K 2103/04* (2018.08); *B32B 2250/02* (2013.01)

(56) References Cited

U.S. PATENT DOCUMENTS

| | | | | |
|---|---|---|---|---|
| 2,753,623 | A * | 7/1956 | Boessenkool | B22F 7/06 228/205 |
| 2,827,809 | A * | 3/1958 | Beam | B23K 20/04 228/4.1 |
| 3,095,500 | A * | 6/1963 | Jost | B22F 7/04 219/83 |
| 3,269,004 | A * | 8/1966 | Smith, Jr. | B23K 20/2275 228/262.44 |
| 3,350,772 | A * | 11/1967 | Ulam | B23K 20/2275 428/653 |
| 3,386,161 | A * | 6/1968 | Ruf | C23F 1/00 228/205 |
| 3,481,023 | A * | 12/1969 | Joseph | B23K 20/2275 228/262.44 |
| 3,587,284 | A * | 6/1971 | Name not available | B23K 20/04 427/133 |
| 3,620,880 | A | 11/1971 | Lemelson | |
| 3,683,471 | A * | 8/1972 | Lemelson | B21C 35/02 425/327 |
| 3,771,215 | A * | 11/1973 | Williams | B23K 11/087 228/5.7 |
| 4,213,558 | A * | 7/1980 | Hirobe | B23K 20/04 164/76.1 |
| 4,227,061 | A * | 10/1980 | Westfall | B23K 13/06 219/601 |
| 4,260,095 | A * | 4/1981 | Smith | B23K 20/04 228/173.7 |
| 4,477,011 | A | 10/1984 | Austin | |
| 4,684,053 | A * | 8/1987 | Fastner | B21B 1/38 228/205 |
| 4,782,994 | A * | 11/1988 | Raybould | B23K 20/04 164/463 |
| 5,630,467 | A * | 5/1997 | Yoshimura | B22D 11/1213 164/486 |
| 5,636,543 | A * | 6/1997 | Kajiwara | B21B 1/26 72/234 |
| 5,810,069 | A * | 9/1998 | Flick | B22D 11/1206 164/476 |
| 6,200,409 | B1 * | 3/2001 | Tanaka | B32B 15/18 156/499 |
| 2004/0239013 | A1 * | 12/2004 | Bodin | C21D 8/021 266/111 |
| 2006/0059679 | A1 * | 3/2006 | Honjou | B22D 11/0622 29/527.6 |
| 2009/0095438 | A1 * | 4/2009 | Plociennik | B22D 11/225 164/424 |
| 2009/0217945 | A1 * | 9/2009 | Runkel | B21B 45/08 134/9 |
| 2013/0323523 | A1 * | 12/2013 | Oishi | B21B 1/26 72/200 |
| 2014/0096578 | A1 * | 4/2014 | Eckerstorfer | B21B 15/005 72/40 |
| 2016/0175903 | A1 * | 6/2016 | Runkel | B21B 1/24 29/33 C |
| 2019/0270160 | A1 * | 9/2019 | Runkel | B21B 1/466 |

FOREIGN PATENT DOCUMENTS

| | | | | |
|---|---|---|---|---|
| DE | 3401670 | A * | 8/1985 | ............ B23K 20/04 |
| DE | 10124594 | A1 * | 12/2002 | ........... B23K 20/023 |
| DE | 697 25 170 | T2 | 7/2004 | |
| DE | 101 24 594 | B4 | 10/2006 | |
| DE | 10 2012 207503 | A1 | 11/2013 | |
| EP | 0 053 600 | B1 | 9/1984 | |
| EP | 1 980 345 | A1 | 10/2008 | |
| FR | 2 412 383 | A1 | 7/1979 | |
| FR | 2 532 869 | A1 | 3/1984 | |
| GB | 1046798 | A * | 10/1966 | |
| JP | S54-88861 | A | 7/1979 | |
| JP | S59-66988 | A | 4/1984 | |
| JP | S61-283476 | A | 12/1986 | |
| JP | S62-214887 | A | 9/1987 | |
| JP | H11-226699 | A | 8/1999 | |
| JP | 2010094684 | A * | 4/2010 | |

OTHER PUBLICATIONS

Office Action issued on Jun. 8, 2020 in corresponding Japanese Application No. 2019-526615; 8 pages including English-language translation.

International Search Report and Written Opinion of the International Searching Authority issued on Feb. 19, 2018 in corresponding International application No. PCT/EP2017/079415; 21 pages.

International Preliminary Examination Report issued on Nov. 5, 2018 in corresponding International application No. PCT/EP2017/079415; 74 pages including Partial Machine-generated English-language translation.

Runkel, "Marktrecherche Anbieter plattierter Walzprodukte", SMS group GmbH, 2016; 24 pages including Partial English-language translation.

* cited by examiner

METHOD FOR PRODUCING A CONTINUOUS STRIP-SHAPED COMPOSITE MATERIAL

FIELD

The disclosure relates to a method for producing a continuous strip-shaped composite material.

BACKGROUND

Joining together at least two material partners made of metal or steel by means of roll welding or hot welding to form a composite material is known according to the prior art. This is disclosed, for example, in EP 1 690 606 B1, EP 201 202 B1, EP 053 600 B1, and EP 04 063 B1. Accordingly, plate-shaped sheets are firstly applied to one another, subsequently welded to one another to form a plate package, and then hot rolled to form a roll-cladded hot strip or composite material. Such a technology is accompanied by the disadvantage that the intermediate step, according to which the plate-shaped sheets laid on one another firstly have to be welded to one another, means additional effort for the production sequence and limits the maximum production capacity.

A generic method according to the preamble of claim 1 for producing a composite strip from steel by roll cladding of a directly cast steel strip and the use of such a composite strip are known. In this method, a core strip is directly cast according to the two-roll method and subsequently cladded using a metal cladding strip having low-corrosion to corrosion-resistant cold strip properties. This is performed in that the cladding strip is clad in line as cold strip onto the core strip coming out of the casting heat. The production speed and the cost-effectiveness resulting therefrom of this method is limited because of the casting of the core strip according to the two-roll method.

A cladding method and a device for producing clad plates are known from DE 28 55 804 A, in particular a method and a device for continuously producing a clad plate in such a manner that a molten metal is continuously cast to form an endless solidified strip, wherein one or both surfaces of the hot strip are continuously covered with a cladding metal, wherein the arrangement thus formed of cast strip and cladding material is hot rolled. A water-cooled endless casting mold system is used to produce a continuous solidified strip, which system has a moving mold, which is formed between two mold webs similar to caterpillar tracks. A cast strip, which is solidified by cooling, is drawn off from the other end of this molding chamber. The production of a cast strip by such a moving mold can only be carried out at a limited speed, from which limited cost-effectiveness disadvantageously results.

A generic device according to the preamble of claim 11 is known from JP S62 214887 A.

SUMMARY

During processing of steel, hot rolling of the material is typically performed at a temperature above the recrystallization temperature of steel, i.e., at a temperature of, for example >720° C.

The invention is accordingly based on the object of optimizing the production of a continuous metal strip in the form of a strip-shaped composite material, in which at least one casting machine is used, with respect to the cost-effectiveness, while simultaneously optimizing the possible product spectrum.

A method according to the present invention is used for producing a continuous metal strip in the form of a strip-shaped composite material, having the following steps: (i) providing a base material, which is produced using at least one casting machine as a continuous strand, in particular from steel, and providing at least one cladding material, which is unwound in the form of at least one metal strip by a coil unwinding unit; (ii) bringing together a slab, which has formed from the strand produced using the casting machine by solidification, and the metal strip unwound by the coil unwinding unit; and (iii) hot rolling the materials moved in the direction toward one another formed from the slab, which has formed from the strand produced using the casting machine by solidification, and the at least one metal strip unwound by the coil unwinding unit, so that a single continuous strip-shaped composite material, which consists of the base material and the at least one cladding material, is thus produced by roll cladding. The base material is continuously cast in the casting machine and exits through an opening of a mold of the casting machine into a strand guiding system having cooling. The coil unwinding unit is accommodated in a heatable chamber, whereby the metal strip wound thereon is heated. Before step (ii) and/or during step (ii), the strip formed by solidification from the strand produced using the casting machine and the metal strip unwound by the coil unwinding unit are heated by means of an induction heater, so that the slab and the metal strip are brought together in step (ii) in the hot state at a temperature which is greater than the recrystallization temperature of the base material and the cladding material.

Before step (ii), the slab formed by solidification from the strand produced using the casting machine is descaled and the metal strip unwound by the coil unwinding unit is cleaned, preferably descaled. Before step (iii), a surface temperature of at least one material partner formed from the slab formed from the strand produced using the casting machine and/or the metal strip unwound by the coil unwinding unit is increased on a side which is opposite to the respective other material partner by means of an induction heater.

In the same manner, the invention provides a device for producing a continuous metal strip in the form of a strip-shaped composite material. This device comprises at least one casting machine, using which a continuous strand is produced, in particular from steel, which is used as a base material, at least one coil unwinding unit, using which a metal strip is provided, which is used as a cladding material, and at least one rolling stand in the form of a roll-cladding unit, which is arranged in line with the casting machine and with the coil unwinding unit and downstream of each of them. The casting machine has a mold having walls, between which the base material can be poured in as liquid metal from above and exits downward through an opening into a strand guiding system having cooling. The at least one coil unwinding unit is positioned inside a heatable chamber and has a quick-change unit, by means of which a replacement of coils is possible, wherein the quick-change unit comprises a welding unit, to weld successive metal strips (15) to one another in step (i) of a method as claimed in claim 1. Between the casting machine and the coil unwinding unit, on the one hand, and the roll-cladding unit, on the other hand, a bringing-together unit is arranged, by means of which a slab which has formed by solidification from the strand produced using the casting machine and the metal strip unwound by the coil unwinding unit can be moved in the direction toward one another in the hot state. Upstream of the bringing-together unit and/or as a part thereof, at least one heating unit is provided, wherein the slab which has formed by solidification from the strand produced using the casting machine and the metal strip unwound by the coil unwinding unit are guided through this heating unit. Between the casting machine and the coil unwinding unit, on the one hand, and the bringing-together unit, on the other hand, at least one cleaning unit, preferably a descaling unit is arranged, by means of which the slab formed by solidification from the strand produced using the casting machine and the metal strip unwound by the coil unwinding unit can be cleaned, preferably descaled. Between the bringing-together unit and the roll-cladding unit arranged directly downstream thereof, at least one temperature influencing unit is provided, by means of which the surface temperature of at least one material partner formed from the slab formed from the strand produced using the casting machine and/or the metal strip unwound by the coil unwinding unit can be increased on a side opposite to the respective other material partner, so that an arrangement of material partners formed from the slab, which has formed by solidification from the strand produced using the casting machine, and the metal strip unwound by the coil unwinding unit can be hot rolled in the roll-cladding unit and thus a single continuous strip-shaped composite material, which consists of the base material and the at least one cladding material, results by roll cladding.

The following aspects are to be understood as follows in the meaning of the present invention:

- The feature "slab" is to be understood to mean that this is a cast strand made of metal which is already substantially completely fully solidified, so that rolling of this slab is possible without the risk existing in this case that still liquid components of the metal will be squeezed out from the interior to the exterior. Such a slab can be formed as an endless profile which is produced or cast by means of a casting machine, for example, by continuous casting.
- The feature "bringing together the slab and the metal strip" as defined, for example, for step (ii) of the method according to the invention is to be understood to mean that in this case the slabs are moved in the direction toward each other. This can mean that the individual slabs do not yet touch or contact during step (ii) or at its end. In any case, the individual slabs are moved in the direction toward each other by the bringing together according to step (ii), which is carried out in the bringing-together unit, in such a way that subsequently, specifically in step (iii) of the method according to the invention and/or in the roll-cladding unit of the device according to the invention, an arrangement formed from the slab and the metal strip can be hot-rolled.
- The attribute "hot" or the definition "in the hot state" which is mentioned in conjunction with step (ii) relates to the temperature of the material partner or the slabs and is to be understood to mean that this temperature is above the recrystallization temperature (for example, 720° C.).

The invention is based on the essential finding that the production of a continuous strip-shaped composite material is improved with respect to cost-effectiveness and increasing the production speed in that the base material provided for this purpose is continuously cast in the casting machine in the vertical direction. For the associated device according to the present invention, a mold is used for this purpose for the casting machine which has walls, between which the base material can be poured in from above as liquid metal and exits downward through an opening into a strand guiding system having cooling. In this way, substantially higher throughputs may be achieved in comparison to the technologies mentioned at the outset according to the prior art, in which a core material is produced either according to the two-roll method or by means of a moving mold, which results in improved cost-effectiveness. Furthermore, the use of various materials, which are both continuously cast using the casting machine as the base material and are also provided as the cladding material in the form of an unwound metal strip, enables the implementation of specific material properties of the produced continuous strip-shaped composite material.

Steel or steel alloys, or alternatively also nonferrous metals, can be used as the material which is cast using the casting machines. It is possible in principle for the present invention that the strand produced using the casting machine, from which the slab then forms by solidification, and the metal strip unwound by the at least one coil unwinding unit consist of different material qualities. For example, different steel qualities can be cast in the individual casting machines, which are then bonded in step (iii) of the method according to the invention to form a single continuous strip-shaped composite material.

In one advantageous refinement of the method according to the invention, before step (ii), a speed of at least one material partner slab formed by solidification from the strand produced using the casting machine and the metal strip unwound by the coil unwinding unit can be intentionally influenced. This influencing of the speed of at least one of these two material partners can take place in either a controlled or regulated manner, as a function of further processing variables of the casting-rolling process, which will be explained in detail hereafter. A compensation rolling stand, which is arranged in line between the casting machine and the bringing-together unit, can be provided for influencing the speed of the slab to carry out the method according to the invention and/or for the device according to the invention, wherein the slab is guided through this compensation rolling stand to influence its speed. The influencing of the speed of the cladding material in the form of the unwound metal strip can be carried out directly using the associated coil unwinding unit.

The hot rolling of the slab and the unwound metal strip to form a single continuous strip-shaped composite material by means of hot rolling is improved if the temperature of these two material partners is adapted to one another, before the hot rolling of the slab takes place in step (iii). For this purpose, the material partners are heated before step (ii) and/or before step (iii), to intentionally influence the temperature of the slab and/or the metal strip and adapt it to the temperature of the respective other material partner. In this case, it can also be advantageous to intentionally keep the temperatures of the metal partners different, for example, in the case of different materials, material qualities, or material thicknesses. It is also possible for this purpose to carry out this heating for both material partners simultaneously. For heating the slab and/or the metal strip, at least one heating unit is provided, which is arranged upstream of the bringing-together unit and/or as a part thereof, wherein the material partners is/are guided through this heating unit. A particularly high introduction of energy may be achieved, for example, using a heating unit in the form of an induction heater, combined with the advantage that it only occupies a small installation space, with high energy density at the same time.

In one advantageous refinement of the invention, it can be provided that the slab formed by solidification from the strand produced using the casting machine and the metal strip unwound by the coil unwinding unit are laterally guided before step (ii) to thus align these material partners in relation to one another. In the same manner, this can also take place during step (ii) and/or before step (iii). For this purpose, at least one lateral influencing unit is provided, which can be arranged upstream from the bringing-together unit and/or as a part thereof. Additionally or alternatively, this lateral influencing unit can also be arranged upstream of the roll-cladding unit. The lateral influencing unit can be designed, for example, in the form of a guide roller or a guide ruler, with which the lateral edges of the slabs come into contact in order to be laterally aligned in relation to one another as explained.

In one advantageous refinement of the invention, the above-mentioned lateral influencing unit can be designed in the form of a guide ruler, which is moved by an actuator in the direction of the strip center, in particular using a predetermined force. An alignment of the two material partners in the direction of the strip center is also possible in this way.

In one advantageous refinement of the invention, it can be provided that a lateral influencing unit, preferably in the form of a guide ruler, is also provided downstream of the roll-cladding unit. For this case, it is ensured that the produced continuous strip-shaped composite material is also laterally guided after step (iii), for example, to guide the composite material centered in the middle of a rolling pass through the rolling train and its associated rolling stands. For this purpose, it can also be provided that a guide ruler is moved using a predetermined force in the direction of the strip center to contact the produced composite material on its lateral edges and guide it (possibly back in the direction of the strip center).

The bonding of the individual material partners by means of the hot rolling in step (iii) and/or by the roll-cladding unit is optimized if the slab which has been formed by solidification from the strand produced using the casting machine and the metal strip unwound by a coil unwinding unit are suitably cleaned before step (iii), specifically on the surface of this material partner which is opposite to the respective other material partner and thus comes into contact with it during the hot rolling in step (iii). For this purpose, at least one cleaning unit is provided for the device according to the invention, which is arranged between the casting machine and the coil unwinding unit, on the one hand, and the bringing-together unit, on the other hand. The cleaning unit can optionally also be formed as part of the bringing-together unit. Such a cleaning of the material partners can be performed mechanically, for example, by blasting, brushing, grinding, planing, milling, or the like. Additionally or alternatively thereto, it is possible to carry out the cleaning of the material partners in the form of descaling, wherein a fluid, preferably high-pressure water, is applied to the surfaces of the material partners. For this case, the cleaning unit is designed as a descaling unit, by means of which a fluid can be discharged, preferably under high pressure, onto the surface of at least one material partner. The descaling of the material partners is advisable in particular if steel or a steel alloy is used.

The bonding of the individual material partners by means of the hot rolling in step (iii) and/or by the roll-cladding unit can be further optimized in that before step (iii) and/or upstream of the roll-cladding unit, a surface temperature of at least one material partner formed from the slab, which has formed by solidification from the strand produced using the casting machine, and the metal strip unwound by the coil unwinding unit, is increased. For this purpose, a temperature influencing unit is provided for the device according to the invention, which is positioned between the bringing-together unit and a roll-cladding unit arranged immediately downstream thereof. To implement the increase of the surface temperature, said temperature influencing unit can be designed, for example, as a thermal radiator or the like, which is oriented onto the surface of a material partner.

In one advantageous refinement of the invention, it can be provided that following step (iii), a material condition of the produced single continuous strip-shaped composite material is detected, preferably by x-rays and/or ultrasound. For this purpose, a measuring unit is provided for the device according to the invention downstream of a roll-cladding unit, by means of which an internal material condition of the produced single continuous strip-shaped composite material, in particular the bonding quality, can be detected. A process signal is then expediently generated on the basis of the detected material condition by a control unit, using which a control loop can be formed for the method according to the invention.

In one advantageous refinement of the invention, it can be provided that this method is carried out automatically as a function of at least one predetermined process variable. With reference to the preceding explanation of the invention, this process variable can consist, for example, of the speed which exists before step (ii) for the slab formed by solidification from the strand produced using the casting machine and/or for the metal strip unwound by the coil unwinding unit, and/or the material condition of the produced continuous strip-shaped composite material. Furthermore, such a process variable can also be selected from the group formed in particular from the casting speed of the casting machine, a change of the liquid-core reduction of the strand produced using the casting machine, a temperature difference of the slab and the metal strip before step (ii) and/or before step (iii), a respective speed of the work rollers of the roll-cladding unit, and/or a thickness reduction which is achieved for the produced single strip-shaped composite material in step (iii). The method according to the invention can be designed as a control loop on the basis of the above-mentioned possible process variables and accordingly carried out automatically.

In one advantageous refinement of the invention, it can be provided that a speed of the respective work rollers of a roll-cladding unit is controlled in such a way that a possible "ski formation" of the strip-shaped composite material, which is hot rolled by the and/or in the roll-cladding unit, is counteracted during the exit from this roll-cladding unit. This is advisable in particular for a first roll-cladding unit, which is arranged downstream directly adjoining the bringing-together unit. A further transportation of the produced continuous strip-shaped composite material in the rolling train is accordingly possible without a "ski formation" resulting at the front end of the produced strip-shaped composite material and thus damage to rolling stands downstream of the bringing-together unit being a concern.

In one advantageous refinement of the invention, it can be provided that the produced continuous strip-shaped composite material is severed and/or isolated following step (iii) and/or downstream of a roll-cladding unit, which directly adjoins the bringing-together unit, with the goal of improving following process steps and/or producing the lengths of the final product produced in this plant. Additionally or alternatively, it can be provided that a hold-down device, by means of which a ski formation of the produced single continuous strip-shaped composite material is prevented, is positioned downstream of a roll-cladding unit directly adjoining the bringing-together unit.

In one advantageous refinement of the invention, it can be provided that a further or a second coil unwinding unit is provided, using which a further cladding material in the form of a metal strip can be provided in step (i) of the method according to the invention. This further coil unwinding unit is also arranged in line with the roll-cladding unit, preferably upstream thereof. Subsequent steps (ii) and (iii) of the method according to the invention are accordingly carried out using a total of three plies, which have formed from the slab and the two unwound metal strips. Alternatively thereto, it can be provided that the metal strip, which is unwound by the second coil unwinding unit, is bonded to the single continuous strip-shaped composite material already formed in step (iii) in the hot state with renewed performance of steps (ii) and (iii). For this case, the second coil unwinding unit is arranged downstream of a first roll-cladding unit, which directly adjoins the bringing-together unit. In any case, if, for example, two coil unwinding units are used jointly with a casting machine, a continuous strip-shaped composite material can be produced which consists, for example, in its uppermost and lowermost ply of steels having identical property profiles, wherein a middle ply of this composite material can be formed, for example, from a steel which differs in its properties from the materials used for the peripheral plies.

In one advantageous refinement of the method according to the invention, in step (iii), the cladding material is applied to opposing sides of the slab which has formed by solidification from the strand produced using the casting machine, wherein the cladding material consists of the same material and is unwound by respective separate coil unwinding units.

In one advantageous refinement of the invention, it can be provided that one or more intermediate layers in solid, liquid, or powdered form are introduced between the slabs to be brought together. Such an intermediate layer can passivate or activate the opposing surfaces of the slabs. As a result the tendency toward scaling on the surfaces of the slabs is reduced, and/or the diffusion procedures between the material partners are advantageously influenced.

The plant according to the invention can be referred to as an HRB plant, wherein "HRB" is an abbreviation for high-performance roll bonding.

Further advantages of the present invention include the following aspects:

higher production performance,
better cost-effectiveness,
expansion of the steel types to be produced,
production of roll-clad heavy plates, and
production of roll-clad coils.

BRIEF DESCRIPTION OF THE DRAWINGS

Exemplary embodiments of the invention are described in detail hereafter on the basis of a schematic simplified drawing.

In the figures.

DETAILED DESCRIPTION

Preferred embodiments of a device 10 according to the invention and components thereof are explained hereafter with reference to FIGS. 1 to 4, wherein this device 10 is used for producing a metal strip in the form of a continuous strip-shaped composite material 11. Identical features in the drawings are each provided with identical reference signs. It is to be especially noted here that the drawing is solely shown in simplified form and in particular is not to scale.

Figure 1:
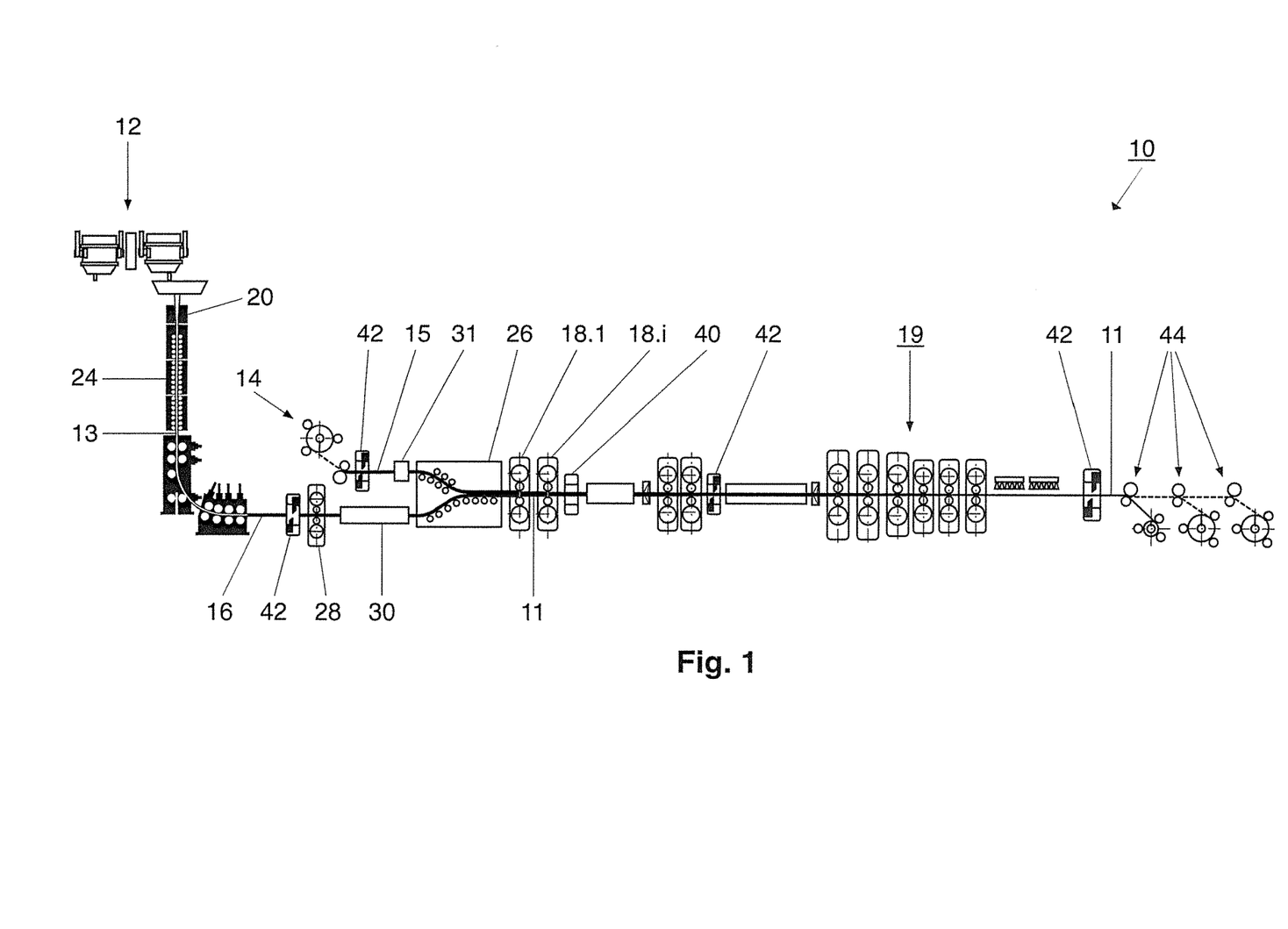
FIG. 1 shows a schematic side view of a device according to the invention, in which at least two casting machines are used.

FIG. 1 shows a schematic simplified side view of the device 10 according to a first embodiment.

The device 10 comprises a casting machine 12, using which a continuous strand 13 is produced, in particular from steel, which is used as a base material. The device 10 furthermore comprises a coil unwinding unit 14, using which a metal strip 15 is provided, which is used as a cladding material and can be suitably unwound by this coil unwinding unit 14. A slab 16 formed by solidification from the strand 13, which slab is subsequently guided jointly with the unwound metal strip 15 through a bringing-together unit 26, which is arranged upstream of the casting machine 12 and the coil unwinding unit 14, and in this way are moved in the direction toward one another. The device 10 furthermore comprises at least one rolling stand in the form of a roll-cladding unit 18.1, which is arranged directly adjoining the bringing-together unit 26 and therefore downstream thereof. The function of this roll-cladding unit 18.1 is also explained separately hereafter.

The bringing-together unit 26 is used for the purpose of moving the slab 16 and the unwound metal strip 15 in the direction toward one another. In the embodiment shown in FIG. 1, it can be provided that the slab 16 and the unwound metal strip 15 already come into contact with one another inside the bringing-together unit 26. According to an alternative embodiment of the bringing-together unit 26, which is shown schematically simplified in the side view according to FIG. 2 and can also be used for the device of FIG. 1, it is provided that the slab 16 and the unwound metal strip 15 do not contact inside this bringing-together unit 26, but rather only outside and downstream thereof, when they run into the roll-cladding unit 18.1 positioned directly adjoining thereon.

Figure 2:
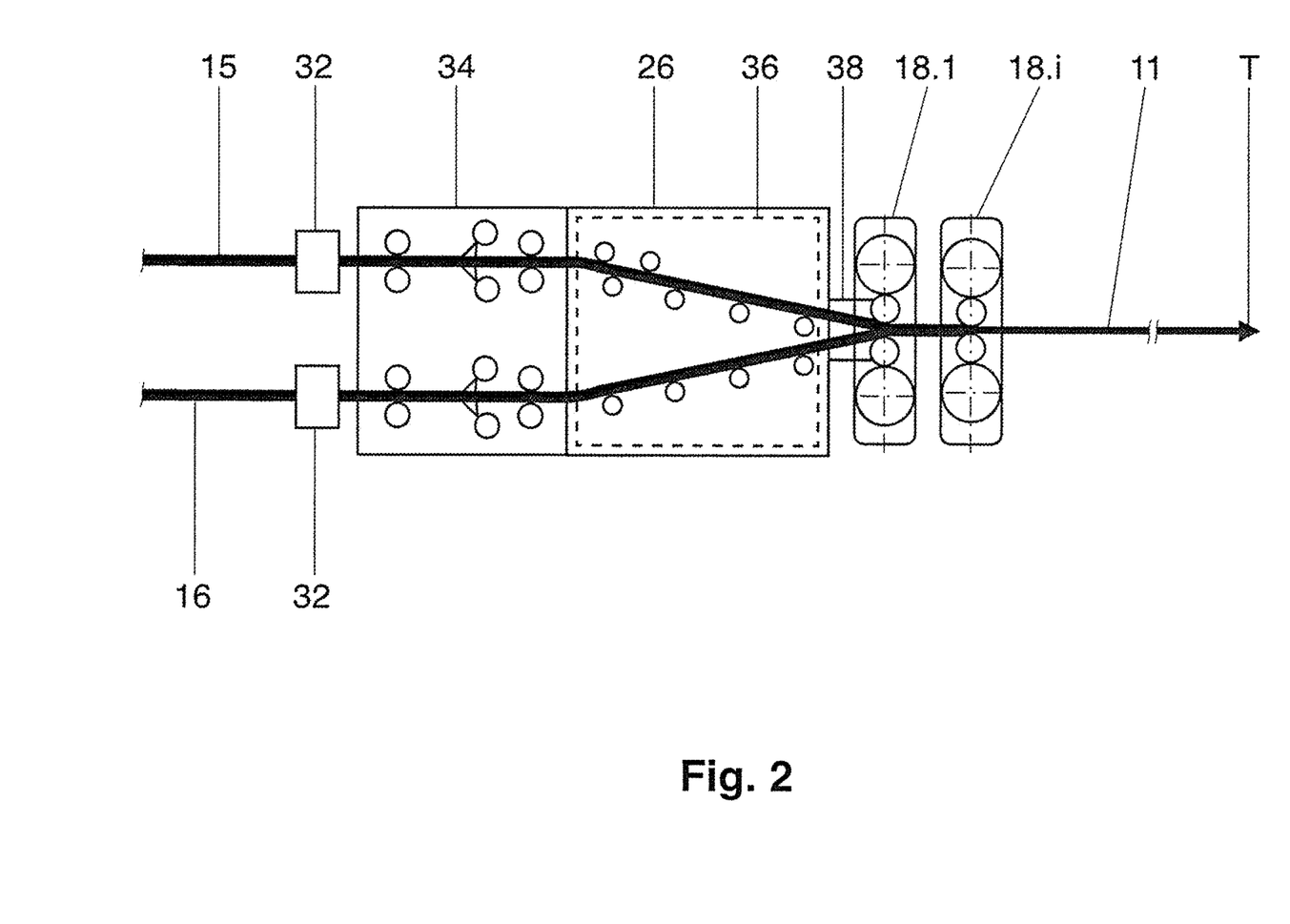
FIG. 2 shows a schematic side view of a modification of a bringing-together unit, which can be part of the device of FIG. 1.

In FIG. 2, a transportation direction, in which the produced continuous strip-shaped composite material 11 is transported or moved (from left to right in the plane of the drawing), is indicated with the arrow "T". With respect to the illustrations of FIG. 1, it is apparent that the composite material 11 is moved therein in the same direction, namely from left to right (viewed in the plane of the drawing).

The device 10 has a compensation rolling stand 28, which is arranged in line between the casting machine 12 and the bringing-together unit 26. The slab 16, which is formed by solidification from the strand 13 produced using the first casting machine 12, is guided through the compensation rolling stand 28. In this way it is possible to control, preferably to regulate, a speed of the slab 16 in the direction of the bringing-together unit 26 by means of the compensation rolling stand 28. In the same manner, the speed at which the unwound metal strip 15 is transported in the direction of the bringing-together unit 26 can be controlled, preferably regulated, by the associated coil unwinding unit 14. It is advantageous in this context if the modulation of the compensation rolling stand 28 and the coil unwinding unit 14 is adapted to one another by means of a preferably shared control unit, so that the slab 16 and the unwound metal strip 15 enter the bringing-together unit 26 at the same speed.

The device 10 comprises a first heating unit 30 (cf. FIG. 1), which is arranged in line between the casting machine 12 and the bringing-together unit 26, and a second heating unit 31, which is arranged in line between the coil unwinding unit 14 and the bringing-together unit 26. The side view of FIG. 1 illustrates that the slab 16 is guided through the first heating unit 30. In the same manner, the unwound metal strip 15 is guided through the second heating unit 31. In this way, the slab 16 and the metal strip 15 are heated according to the principle of through heating, wherein possible temperature differences, which can occur as a result of a transportation route of differing length between the slab 16, which has formed by solidification from the strand 13 produced using the casting machine 12, and the metal strip 15, which has been unwound by the coil unwinding unit 14, are adapted. In this case, it can also be advantageous to keep the temperatures of the material partners intentionally different, for example, in the case of different materials, material qualities, or material thicknesses. As a result thereof, the slab 16 and the metal strip 15 preferably enter the bringing-together unit 26 at a predetermined temperature.

The device 10 has lateral influencing units, which are each arranged upstream of the bringing-together unit 26 and in line with the first casting machine 12 or with the coil unwinding unit 14, respectively. These lateral influencing units 32 are only symbolically indicated in the illustration of FIG. 2 and can be designed in the form of a guide ruler, which is moved by an actuator in the direction of the strip 15 center. The slab 16 and the metal strip 15 are accordingly laterally guided by these guide rulers and are thus aligned in relation to one another.

It is particularly to be noted at this point that these lateral influencing units 32 can also be arranged inside the bringing-together unit 26 and can thus be formed as a part of this bringing-together unit 26.

Figure 3A:
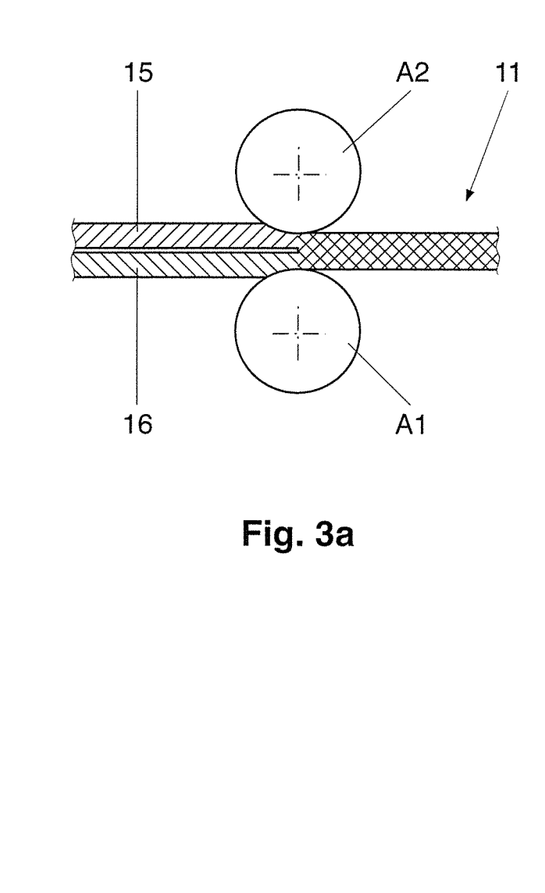
FIG. 3a shows a side view of work rollers of a roll-cladding unit which is part of the device of FIG. 1.
Figure 3B:
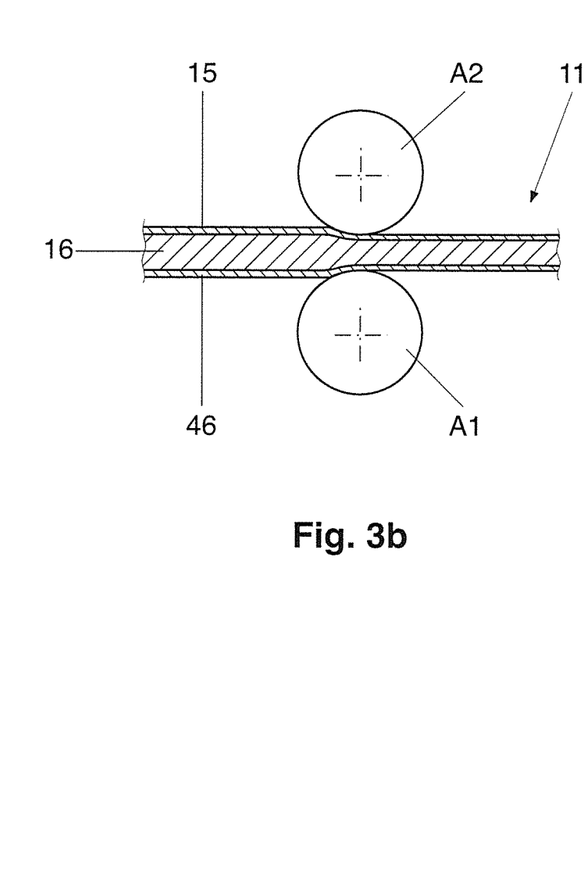
FIG. 3b shows a side view of work rollers of a roll-cladding unit which is part of the device of FIG. 1.

The above-mentioned roll-cladding unit 18.1 is used for the purpose of carrying out hot rolling for the slab 16 and the metal strip 15 and thus producing a continuous strip-shaped composite material 11 therefrom by means of roll cladding. The side view of FIG. 3a shows in schematically simplified form a two-layer roll welding of two material partners, which can consist, for example, of the slabs 16 and the metal strip 15, when they come into contact with the work rollers A1, A2 of the roll-cladding unit 18.1 and are guided through between these work rollers A1, A2. It is apparent from the side view of FIG. 3a that a composite is formed from the slab 16 and the metal strip 15 when they enter the roll-cladding unit 18.1 jointly, which is then hot rolled or roll clad by the work rollers A1, A2 of the roll-cladding unit.

Adjoining the roll-cladding unit 18.1 or downstream thereof, further rolling stands and/or roll-cladding units can be provided, using which hot rolling is carried out for the strip-shaped composite material 11. It is indicated in FIG. 1 by the reference sign "18.i" that at least one further roll-cladding unit or multiple such rolling stands can be arranged in the rolling train 19 downstream of the roll-cladding unit 18.1. Furthermore, further rolling stands can be provided in the rolling train 19 adjoining the roll-cladding units 18.i.

The device 10 comprises—as shown in the illustration in FIG. 2—a cleaning unit in the form of a descaling unit 34, which is arranged upstream of the bringing-together unit 26. The slab 16 and the metal strip 15 are suitably descaled by this descaling unit 34, which is advantageous in particular if at least one of these two material partners, or both, (each) consist/consists of steel or a steel alloy. Furthermore, the side view of FIG. 2 illustrates that the device 10 comprises a protective gas unit 36, which is integrated into the bringing-together unit 26. The protective gas unit 36 is merely symbolized in simplified form by dashed lines in the illustration of FIG. 2. The slab 16 and the metal strip 15, before they are bonded to one another by means of hot rolling or roll cladding, are guided through the protective gas unit 36, which effectively prevents the formation of "fresh" scale on the opposing surfaces of these material partners. The bonding of the slab 16 and the unwound metal strip 15 by means of the hot rolling in step (iii) can furthermore be improved in that a surface temperature of at least one of these material partners is influenced on the respective opposing sides thereof, preferably increased. For this purpose, a temperature influencing unit 38, which is shown in symbolically simplified form in the illustration of FIG. 2, is arranged directly upstream of the roll-cladding unit 18.1.

The device 10 can also comprise a rolling train 19, using which the produced continuous strip-shaped composite material 11 can be rolled out to lesser thicknesses.

The device furthermore comprises at least one measuring unit 40, using which the material condition of the continuous strip-shaped composite material 11, which has been produced by means of hot rolling by the roll-cladding unit 18.1, can be detected. The measuring unit 40 is arranged, for example, behind or downstream of the roll-cladding unit 18.1, and preferably functions according to the principle of x-rays and/or ultrasound. For this purpose, it can be provided that associated sensors of the measuring unit 40 are arranged above and/or below the continuous strip-shaped composite material 11, so that an upper side and/or a lower side of the metal strip in the form of this composite material 11 can be examined therewith with respect to its material condition and/or surface quality.

In the embodiment of FIG. 1, the casting machine 12 is designed in the form of a vertical continuous-casting unit. In this case, the casting machine 12 has a mold 20 having walls. The base material is poured in from above as liquid metal between the walls of the mold 20. The mold 20 has an opening at its lower side. The liquid metal can accordingly exit through this opening into a strand guiding system 24, which is equipped with cooling.

Severing units 42, for example, in the form of flame cutting units, pendulum shears, drum shears, or the like, are arranged at various points along the process line of the device 10. These severing units 42 enable cutting out and/or discharge of unusable material. Additionally or alternatively, a discontinuous rolling mode of individual strips and/or an emergency mode using only the casting machine 12 can be implemented with use of these severing units 42. The severing can also be performed with the goal of improving the following process steps and/or producing the lengths of the final product produced in this plant. In this regard, it is to be noted that the positions of the respective severing units 42 shown in FIG. 1 are only to be understood as examples.

At least one reel 44 is provided at the end of the rolling train 19 to wind the produced continuous strip-shaped composite material 11 into a coil. A plurality of such reels 44 can expediently also be provided, having corresponding units (not shown) for switching over between the individual reels 44. Additionally and/or alternatively, at least one shelf or the like can be provided at the end of the rolling train 19, to remove plates or heavy plates therefrom.

Figure 3C:
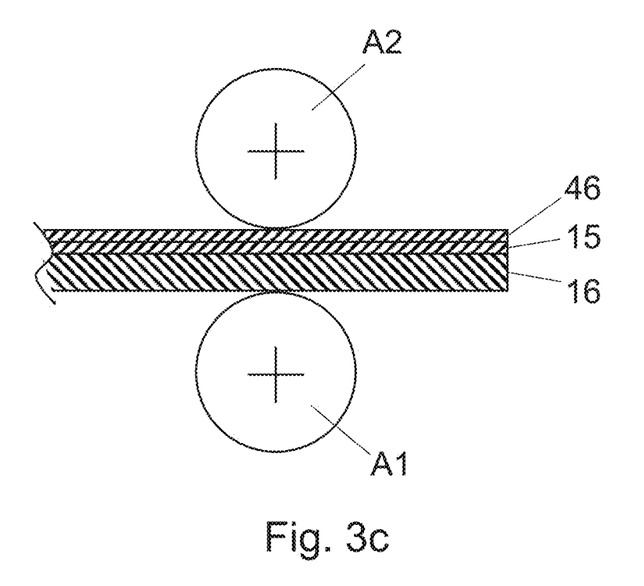
FIG. 3c shows a side view of work rollers of a roll shows a side view of work rollers of a roll-cladding unit which is part of the device of FIG. 1.
Figure 3D:
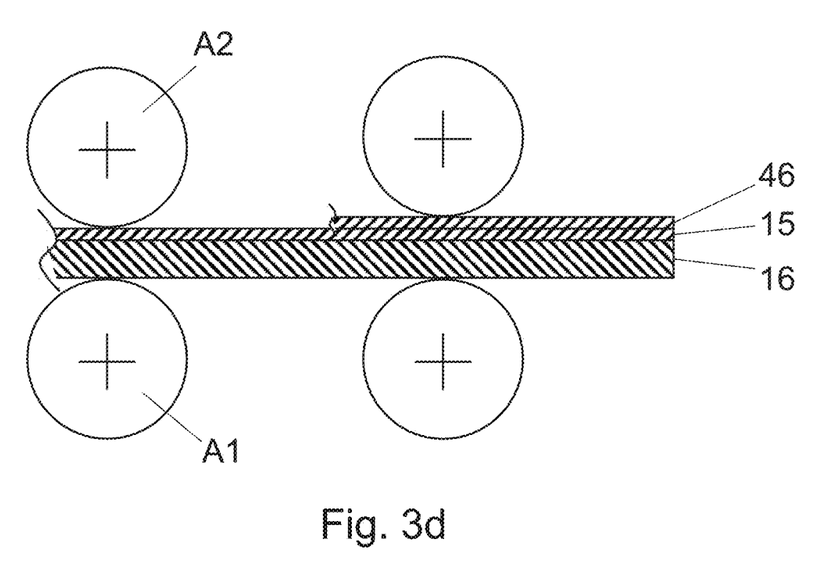
FIG. 3d shows a side view of work rollers of a roll shows a side view of work rollers of a roll-cladding unit which is part of the device of FIG. 1.
Figure 4:
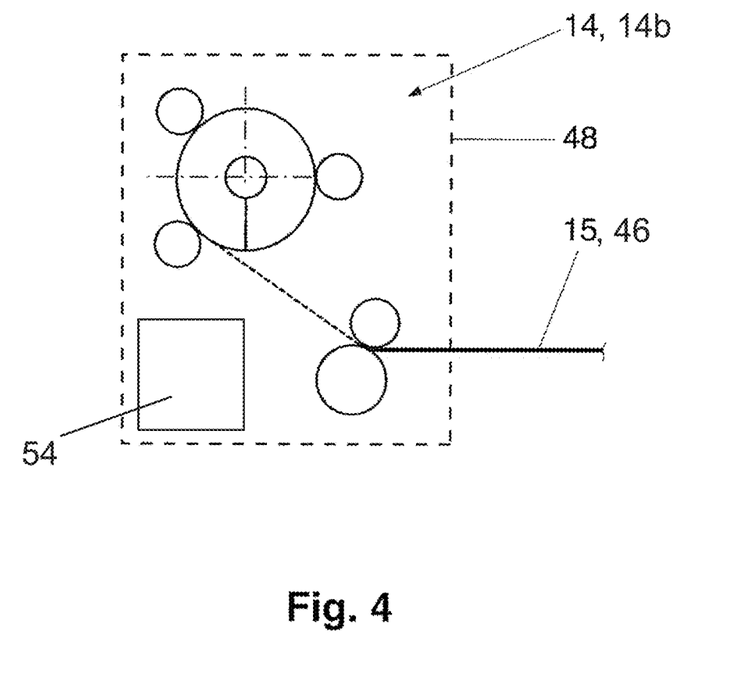
FIG. 4 shows a schematic simplified enlarged view of a modified coil unwinding unit, which can be part of the device of FIG. 1.

The embodiment of FIG. 1 can be modified in that a further or second coil unwinding unit 14bis provided, using which a further continuous metal strip 46 is provided, which is also used as a cladding material. This further coil unwinding unit 14b can also be arranged in line with the roll-cladding unit 18.1. It is accordingly possible to carry out above-explained steps (ii) and (iii) of the method according to the invention using a total of three plies, which are formed from the slab 16 formed by solidification from the strand 13 produced using the casting machine 12 and the two metal strips unwound by the respective coil unwinding units. Roll cladding of a total of three plies between the work rollers A1 and A2 of the roll-cladding unit 18.1 is illustrated in schematically simplified form in the side view of FIG. 3b. In this case, the slab 16 is used as a base material, wherein the metal strips 15 and 46 are used as the cladding material, which are each clad on opposing sides of the slabs 16. In this regard, it is to be noted that different material qualities and/or steel qualities can be used for each of the base material (in the form of the slab 16), on the one hand, and for the cladding material (in the form of the metal strips 15, 46), on the other hand. The cladding material used for the metal strips 15, 46 can consist of the same material. Furthermore, it is to be noted that as shown in FIG. 3c—the two metal strips 15, 46 can also be applied or clad on the same side of the slab 16.

A further modification of the device 10 according to FIG. 1 can be performed in such a manner that the coil unwinding unit 14 is accommodated in a heatable chamber 48. This is shown in simplified form in the illustration of FIG. 4. It is ensured by such an accommodation of the coil unwinding unit 14 in the heatable chamber 48 that metal strip 15 unwound thereby already has a predetermined temperature, with respect to bringing together with the slab 16 and the subsequent hot rolling to form a single continuous strip-shaped composite material 11. The heating of the coil unwinding unit 14 or the metal strip 15 unwound thereby in the heatable chamber 48 can also be carried out in a protective gas atmosphere. Additionally or alternatively, the coil unwinding unit 14 may comprise a quick-change unit comprising a welding unit 54 for welding successive metal strips to one another.

The method according to the invention for producing the continuous strip-shaped composite material 11 can be carried out using the above-explained embodiments of the device 10 according to the invention. This method can be carried out automatically, and preferably in a regulated manner, as a function of at least one of the process variables mentioned at the outset.

The invention claimed is:

1. A method for producing a continuous, strip-shaped composite material, the method comprising:
   (i) providing a base material, whereby a slab is continuously formed from a strand produced by at least one casting machine, and providing at least one cladding material formed as a metal strip by a coil unwinding unit,
   (ii) bringing together the slab produced by the at least one casting machine and the cladding material unwound by the coil unwinding unit, and
   (iii) hot rolling the slab and the cladding material, which have been brought together, to form the continuous, strip-shaped composite material via roll cladding,
   wherein, before step (ii), the slab is descaled and the cladding material is cleaned and/or descaled,
   wherein, before step (ii), the slab and/or the cladding material are heated by means of an induction heater to a temperature greater than respective crystallization temperatures of the slab and/or the cladding material,
   wherein, before step (iii), at least one of the slab and the cladding material is guided through a protective gas unit,
   wherein a surface temperature of at least one of the slab and the cladding material is increased by a thermal radiator arranged upstream of and directly adjacent to a roll-cladding unit at which step (iii) begins and downstream of the protective gas unit,
   wherein the base material is continuously and vertically cast in the casting machine and exits through an opening of a mold of the casting machine into a strand guiding system having cooling,
   wherein the coil unwinding unit is accommodated in a heatable chamber and the cladding material wound thereon is thus heated to a predetermined temperature.

2. The method as claimed in claim 1, wherein, before step (ii) at least one of the slab and the cladding material is passed through a compensation rolling stand which controls a speed of the slab and/or the cladding material.

3. The method as claimed in claim 1, wherein, before and during step (ii), at least one lateral influencing unit is used to laterally align at least one of the slab and the cladding material relative to one another.

4. The method as claimed in claim 1, wherein, following step (iii), a material condition of the continuous, strip-shaped composite material is detected, and
   wherein a control loop for controlling the method is formed based on the detected material condition.

5. The method as claimed in claim 1, wherein the method is carried out automatically as a function of at least one predetermined process variable which comprises at least one of:
   a casting speed of the casting machine,
   a change of a liquid-core reduction of the strand produced using the casting machine,
   a speed of the slab and/or the cladding material present before step (ii),
   a temperature difference of the slab and the cladding material before step (ii) and/or before step (iii),
   a respective speed of work rollers of the roll-cladding unit, and
   a thickness reduction achieved in step (iii) of the continuous, strip-shaped composite material.

6. The method as claimed in claim 1, wherein the at least one cladding material is two cladding materials,
   wherein the two cladding materials are applied, in step (iii), to opposing sides of the slab, and
   wherein the two cladding materials are formed from the same material and are provided by separate coil unwinding units.

7. The method as claimed in claim 1, wherein the slab and the cladding material each consist of different material qualities,     wherein at least one further cladding material formed as a metal strip is provided by a further coil unwinding unit, and     wherein steps (ii) and (iii) are carried out to form a continuous, three-ply, strip-shaped composite material via roll cladding with the slab, the cladding material, and the further cladding material.

8. The method as claimed in claim 7, wherein the cladding material and the further cladding material are formed from differing materials, and     wherein the cladding material and the further cladding material are applied to opposite sides of the slab or on a same side of the slab.

9. The method as claimed in claim 1, wherein at least one intermediate layer in solid, liquid, or powdered form, which activates or passivates at least one of the slab and the cladding material, is introduced between the slab and the cladding material.

10. The method as claimed in claim 1, wherein descaling is achieved by a pressurized discharge of a fluid.

11. The method as claimed in claim 1, wherein, before step (iii), at least one of the slab and the at least one cladding material is profiled, which comprises at least one of: diagonally chamfering a lateral edge and trimming by a vertical cut.

12. The method as claimed in claim 1, wherein the coil unwinding unit comprises a welding unit for welding successive metal strips to one another, and the metal strip of the at least one cladding material provided by the coil unwinding unit in step (i) comprises successive metal strips welded to one another.

13. The method as claimed in claim 1, further comprising: providing at least one severing unit, and     wherein a first of the at least one severing unit is arranged directly downstream of the at least one casting machine.

14. The method as claimed in claim 13, wherein the at least one severing unit is a plurality of severing units, and     wherein a second of the plurality of severing units is arranged downstream of the coil unwinding unit so as to sever the at least one cladding material.

15. The method as claimed in claim 1, wherein at least one further cladding material formed as a metal strip is provided by a further coil unwinding unit, and     wherein the continuous, strip-shaped composite material formed in step (iii) is subsequently brought together with the at least one further cladding material and hot rolled with the at least one further cladding material to form a three-ply composite material.

16. The method as claimed in claim 1, wherein at least one further cladding material formed as a metal strip is provided by a further coil unwinding unit, and     wherein steps (ii) and (iii) are carried out to form a continuous, three-ply, strip-shaped composite material via roll cladding with the slab, the cladding material, and the further cladding material such that the cladding material and the further cladding material are applied to the same side of the slab.

17. The method as claimed in claim 1, wherein at least one further cladding material formed as a metal strip is provided by a further coil unwinding unit, and     wherein steps (ii) and (iii) are carried out to form a continuous, three-ply, strip-shaped composite material via roll cladding with the slab, the cladding material, and the further cladding material such that the cladding material and the further cladding material are applied to opposite sides of the slab.

\* \* \* \* \*